United States Patent [19]

Peckham

[11] 4,028,078

[45] June 7, 1977

[54] METHOD AND APPARATUS FOR ABSORPTION REFRIGERATION SYSTEM

[75] Inventor: David G. Peckham, La Crosse, Wis.

[73] Assignee: The Trane Company, La Crosse, Wis.

[22] Filed: June 17, 1976

[21] Appl. No.: 696,945

[52] U.S. Cl. .................................. 62/101; 62/2; 62/476

[51] Int. Cl.² .................. F25B 15/00; F25B 27/00

[58] Field of Search ............... 62/101, 104, 2, 476

[56] References Cited

UNITED STATES PATENTS

| | | | |
|---|---|---|---|
| 2,030,350 | 2/1936 | Bremser | 62/2 |
| 3,242,679 | 3/1966 | Puckett et al. | 62/2 |
| 3,389,573 | 6/1968 | Papapanu et al. | 62/101 |
| 3,483,710 | 12/1969 | Bearint | 62/101 |
| 3,528,491 | 9/1970 | Bell, Jr. | 62/101 |
| 3,651,655 | 3/1972 | Dyre | 62/476 |
| 3,837,174 | 9/1974 | Miyagi et al. | 62/476 |

Primary Examiner—Lloyd L. King
Attorney, Agent, or Firm—Carl M. Lewis

[57] ABSTRACT

A novel absorption type refrigeration system is disclosed which is capable of being operated from a relatively low temperature heat source. A lithium bromide absorption solution equilibrium diagram for this cycle is also included. This system uses two generators and two absorbers. Vapor generated in the low pressure generator is directly absorbed in the high pressure absorber.

12 Claims, 2 Drawing Figures

METHOD AND APPARATUS FOR ABSORPTION REFRIGERATION SYSTEM

BACKGROUND OF THE INVENTION

Absorption refrigeration systems operable from the sun's radiant energy have been proposed for more than forty years as will be seen from U.S. Pat. No. 2,030,350. Various cascaded absoprtion refrigeration systems have been proposed using multiple absorbers and/or multiple generators as will be seen in U.S. Pat. No. 3,483,710. Systems using lithium bromide and water as an absorption solution have been in use for many years.

SUMMARY OF THE INVENTION

The instant invention pertains to absorption refrigeration systems using a brine such as lithium bromide and water for an absorption solution. More particularly, it pertains to a system that is capable of functioning from a low temperature energy source such as the rays of the sun, particularly where no means is employed to concentrate the radiant energy. Heating medium for powering the absorption refrigeration system heated by nonconcentrating radiant energy collectors may be heated only to 165° F or 170° F. The instant invention alters the basic lithium bromide absorption cycle to make it more applicable to this or other low temperature heat sources. The cycle is cascaded in such a way as to allow high solution concentration with relatively low temperature heat sources.

It is thus the primary object of this invention to provide an absorption refrigeration system particularly usable with low temperature heat sources.

It is a further object of this invention to provide a refrigeration system using a brine-type absorption solution such as lithium bromide and water, which system operates effectively on solar energy, particularly where nonconcentrating radiant energy collectors are employed. This is accomplished through the use of a low pressure generator which increases the concentration of the brine solution and delivers the vapor thereof to a secondary absorber.

The invention contemplates both the method and the apparatus for performing the method of the refrigeration cycle.

Specifically, this invention involves an absorption refrigeration system using a thermodynamic cycle comprising a generator means, condenser means, evaporator means, and absorber means operatively connected together; said absorber means including a low pressure absorber and a high pressure absorber; said generator means including a low pressure generator and a high pressure generator and; said high pressure absorber being operatively associated to absorb vapor generated in said low pressure generator.

Further, this invention specifically involves a refrigeration method comprising the steps of:

a. heating at high pressure by an external heat source, a fully diluted absorption solution to generate a refrigerant vapor and a partially concentrated absorption solution;

b. cooling said refrigerant vapor to form a refrigerant condensate;

c. evaporating said refrigerant condensate to derive a cooling effect and thereby forming a refrigerant vapor;

d. heating at low pressure by an external heat source said partially concentrated absorption solution to generate a secondary vapor and a concentrated absorption solution;

e. passing said concentrated absorption solution in intimate contact with said refrigerant vapor to thereby absorb said refrigerant vapor into said absorption solution at low pressure to form a partially diluted absorption solution;

f. passing said partially diluted absorption solution at high pressure in intimate contact with said secondary vapor to absorb said secondary vapor and form a fully diluted absorption solution; and g. returning said fully diluted solution to step a.

Other objects and advantwages of this invention will become more apparent as this specification proceeds to describe the invention with reference to the drawings.

Figure 1:
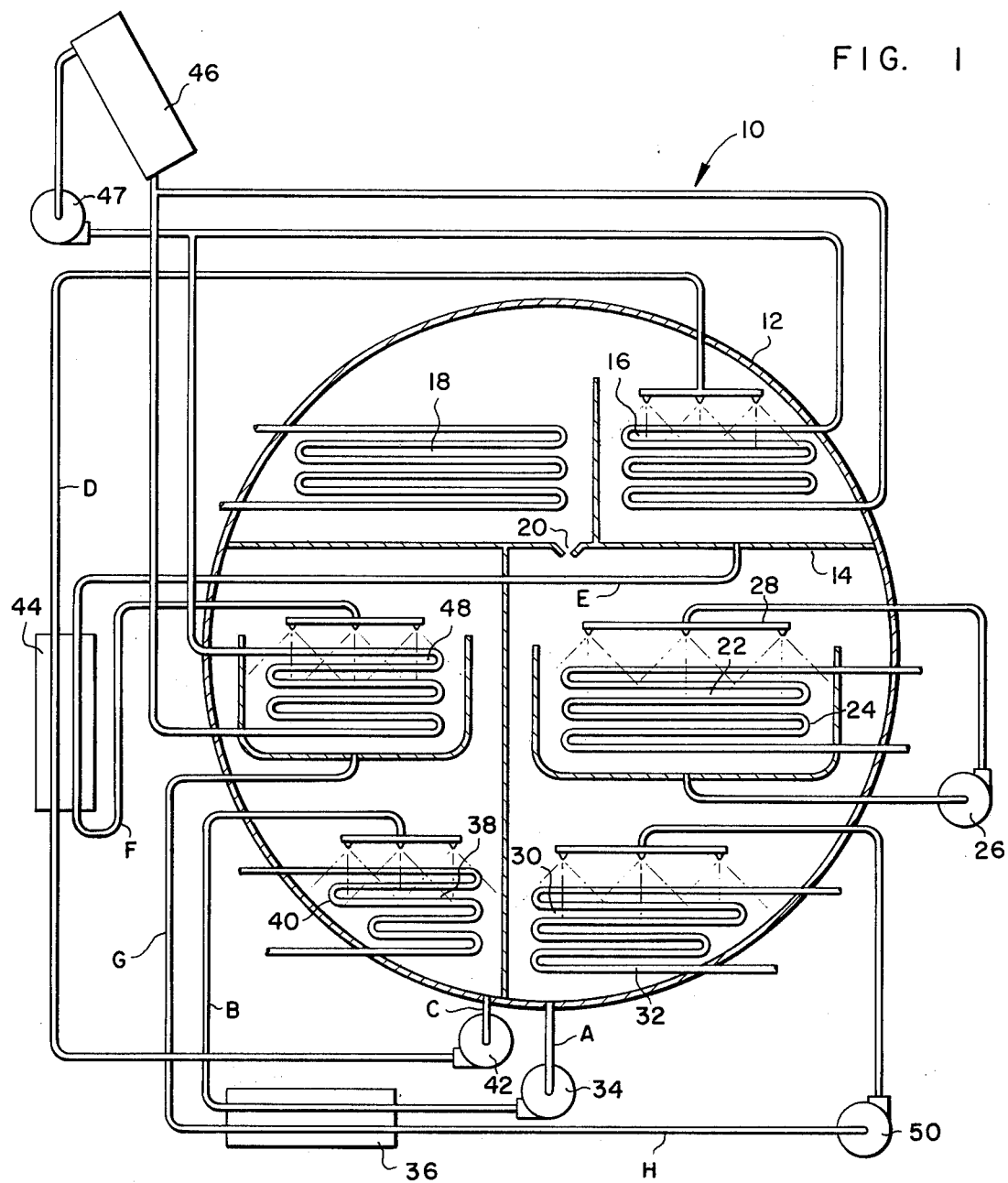
FIG. 1 is a schematic flow diagram of a refrigeration system employing my invention.
Figure 2:
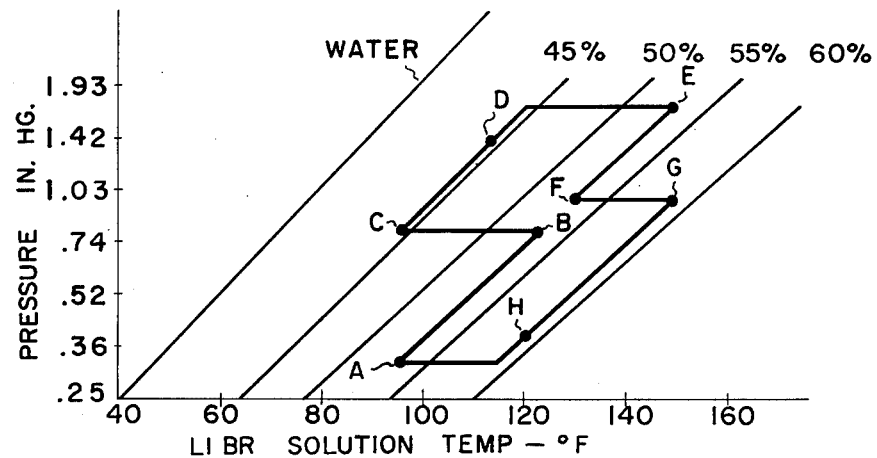
FIG. 2 is an equilibrium cycle diagram for the absorption solution showing the relation of vapor pressure, temperature and concentration.

To further correlate FIGS. 1 and 2, the absorption solution state points identified in FIG. 2 by upper case letters, have also been applied to the flow diagram of FIG. 1.

DETAILED DESCRIPTION

For purposes of this disclosure and claims, the term "concentrated" used in connection with the absorption solution is merely intended to connote a solution having stronger affinity for absorbing the refrigerant than a semi-concentrated or diluted solution. It is not intended to connote a saturated solution as frequently used in the chemical arts.

Also, the terms "low" and "high" pressure used to define the absorbers are not intended to connote absolute values but rather merely the operating pressure values relative to the other absorbers.

In like manner, the terms low and high pressure used to define the generators are not intended to connote absolute values but rather merely the operating pressures relative to the other generator.

In view of the foregoing definition, it will be understood that the low pressure generator may have as hereinafter disclosed an operating pressure higher than the operating pressure of the high pressure absorber.

The refrigerated system 10 includes a single hermetic shell 12 which by various partitions 14 may be divided into compartments as shown.

Refrigerant vapor which is vaporized from the absorption solution in the high pressure generator 16 is condensed by condenser 18. The refrigerant condensate passes via orifice 20 into the evaporator 22 where heat is added thereto by evaporator tubes 24, conducting water to be chilled, thereby vaporizing the refrigerant. A circulating pump 26 and spray tree 28 may be provided if desired. The refrigerant condensate water is thus evaporated to produce a cooling effect on tubes 24 and the refrigerant vapor so produced passes into intimate contact with the lithium bromide and water absoprtion solution in the low pressure absorber 30 wherein the refrigerant vapor is absorbed. Absorber 30 is cooled by passing cooling water through tubes 32.

The partially diluted absorption solution is passed via pump 34 through heat exchanger 36, where it is heated and then to high pressure absorber 38 which is also cooled by passing cooling water passing through tubes 40 thereof. The absorption solution in the high pressure absorber absorbs water vapor generated in the low pressure generator to thereby become fully diluted. The fully diluted absorption solution is then passed via pump 42 through heat exchanger 44, where it is heated, and then delivered to the high pressure generator 16.

High pressure generator 16 is heated by heat exchange medium which may be heated by solar radiation such as solar collector 46 and circulated by pump 47. A typical temperature at which this medium may be delivered to the high pressure generator is 165° F to 170° F. The vapor generated passes to the condenser 18 as hereinbefore described.

The partially concentrated absorption solution passes through heat exchanger 44, where it is cooled, and then to low pressure generator 48. In the low pressure generator the partially concentrated absorption solution is again heated by heat exchange with a heating medium heated by solar radiation as at solar collector 46. This heating medium is delivered to the low pressure generator at a typical temperature of about 165° F to 170° F, i.e., about the same temperature as delivered to the high pressure generator. This heat delivered to the low pressure generator produces further vapor and leaves a fully concentrated absorption solution. The vapor so generated in the low pressure generator passes to the high pressure absorber 38 where the vapor is absorbed as hereinbefore described. The fully concentrated absorption solution passing from the low pressure generator passes via heat exchanger 36, where it is cooled and then to pump 50 for delivery to low pressure absorber 30.

It will be appreciated that the cooling coils or tubes of condenser 18 and absorbers 30 and 38 may be connected in parallel or series as may be required by individual application as is well-known to those having skill in the art. City water, cooling tower water, or stream water may be the cooling water source.

The thermodynamic aspects of the solution may be best understood by reference to FIG. 2. The equilibrium cycle diagram is for an absorption solution comprising lithium bromide and water. The percent lines indicate solutions having the identified percent by weight of lithium bromide.

The diagram shows that the state of the absorption solution to change from A to B in heat exchanger 36, from B to C in high pressure abosorber 38, from C to D in heat exchanger 44, form D to E in high pressure generator 16, from E to F in heat exchanger 44 from F to G in low pressure generator 48, from G to H in heat exchanger 36, and from H to A in low pressure absorber 30.

Other absorption solutions may be used with my invention and the number of absorbers and generators that may be cascaded in accordance with my invention may be increased. Thus, although I have described in detail my preferred embodiment of my invention, I comtemplate that many changes be made without departing from the scope or spirit of my invention, and I desire to be limited only by the claims.

I claim:

1. An absorption refrigeration system using a thermodynamic cycle comprising generator means, condenser means, evaporator means, and absorber means operatively connected together;

said absorber means including a low pressure absorber and a high pressure absorber;

said generator means including a low pressure generator and a high pressure generator; and said high pressure absorber being operatively associated to absorb vapor generated in said low pressure generator.

2. The system defined by claim 1 wherein said high pressure absorber is operatively associated to absorb vapor into an absorption solution partially diluted in said low pressure absorber.

3. The system defined by claim 1 wherein said low pressure generator is operatively associated to further concentrate absorption solution partially concentrated in said high pressure generator.

4. The system defined by claim 1 wherein said low pressure generator has a higher operating pressure than said high pressure absorber.

5. The system defined by claim 1 wherein each of said high and said low pressure generators are heated by a heating medium delivered to said generators at approximately the same temperature.

6. The system defined by claim 5 wherein the flow relationship of the heating medium delivered to said generators is a parallel flow relationship.

7. An absorption refrigeration system comprising:

a refrigerant flow circuit extending from a high pressure generator, through a condenser and evaporator to a low pressure absorber;

a solution flow circuit extending from said low pressure absorber through a first heat exchanger, a high pressure absorber, a second heat exchanger, a high pressure generator, said second heat exchanger, a low pressure generator, said first heat exchanger and back to said low pressure absorber; and a vapor flow circuit extending from said low pressure generator portion of said solution circuit to said high pressure absorber portion of said solution flow circuit.

8. The system defined by claim 7 including a pump in that portion of said solution flow circuit downstream of said low pressure absorber and upstream of said high pressure absorber for passing solution from said low pressure absorber to said high pressure absorber.

9. The method of producing refrigeration comprising the steps of:

a. heating at high pressure by an external heat source a fully diluted absorption solution to generate a refrigerant vapor and a partially concentrated absorption solution;

b. cooling said refrigerant vapor to form a refrigerant condensate;

c. evaporating said refrigerant condensate to derive a cooling effect and thereby forming a refrigerant vapor;

d. heating at low pressure by an external heat source said partially concentrated absorption solution to generate a secondary vapor and a concentrated absorption solution;

e. passing said concentrated absorption solution in intimate contact with said refrigerant vapor to thereby absorb said refrigerant vapor into said absorption solution at low pressure to form a partially diluted absorption solution;

f. passing said partially diluted absorption solution at high pressure in intimate contact with said secondary vapor to absorb said secondary vapor and form a fully diluted absorption solution; and g. returning said fully diluted solution to step (a).

10. In an absorption refrigeration process, the seriatim steps of treating the absorption solution comprising:
   a. heating solution which has been partially diluted from a first temperature to a second temperature while maintaining its concentration substantially constant;
   b. diluting said solution by absorbing vapor therein at a substantially constant vapor pressure thereby fully diluting the solution;
   c. heating the fully diluted solution from a third temperature to a fourth temperature while maintaining its concentration substantially constant;
   d. further heating the fully diluted solution to a fifth temperature thereby vaporizing a portion thereof to thereby form a partially concentrated solution;
   e. cooling the partially concentrated solution from said fifth temperature to a sixth temperature while maintaining its concentration substantially constant;
   f. further heating the partially concentrated solution from said sixth temperature to a seventh temperature thereby vaporizing a portion thereof to form a fully concentrated solution;
   g. cooling the fully concentrated solution from said seventh temperature to an eighth temperature while maintaining its concentration substantially constant;
   h. diluting the concentrated solution by absorbing vapors therein at substantially constant vapor pressure thereby partially diluting the solution; and
   i. recycling the solution formed by step (h) in the manner defined by steps (a) through (h).

11. The process as defined by claim 10 wherein the vapor absorbed into the solution at step (b) is derived from step (f).

12. The process as defined by claim 10 wherein said fifth and seventh temperatures are about the same value and said first and third temperatures are about the same value.

* * * * *